United States Patent
Albertini et al.

(10) Patent No.: US 6,823,963 B2
(45) Date of Patent: Nov. 30, 2004

(54) SEISMIC WAVE MEASURING DEVICES

(75) Inventors: Carlo Albertini, Ispra (IT); Kamel Labibes, Orino (IT)

(73) Assignee: European Community, Brussels (BE)

( * ) Notice: Subject to any disclaimer, the term of this patent is extended or adjusted under 35 U.S.C. 154(b) by 0 days.

(21) Appl. No.: 10/203,901

(22) PCT Filed: Feb. 16, 2001

(86) PCT No.: PCT/IB01/00281
§ 371 (c)(1),
(2), (4) Date: Aug. 15, 2002

(87) PCT Pub. No.: WO01/61381
PCT Pub. Date: Aug. 23, 2001

(65) Prior Publication Data
US 2003/0012084 A1 Jan. 16, 2003

(30) Foreign Application Priority Data
Feb. 16, 2000 (EP) .............................. 00301184

(51) Int. Cl.[7] ................................. G01V 1/16
(52) U.S. Cl. .......................... 181/122; 367/14; 367/178
(58) Field of Search ................................ 181/122, 401; 367/14, 178

(56) References Cited

U.S. PATENT DOCUMENTS

| 2,074,161 A | * | 3/1937 | Bills ........................... 181/401 |
| 3,894,428 A | | 7/1975 | Boddicker et al. |
| 4,300,220 A | * | 11/1981 | Goff et al. ................. 181/401 |
| 4,374,378 A | * | 2/1983 | Lee ............................ 181/122 |
| 4,525,645 A | * | 6/1985 | Shirley et al. .............. 310/337 |

FOREIGN PATENT DOCUMENTS

| JP | 55 059367 A | 5/1980 |
| JP | 58 205882 A | 3/1984 |
| JP | 09 243607 A | 1/1998 |
| SU | 949 585 A | 8/1982 |

OTHER PUBLICATIONS

Layer, E. "Measuring System for Monitoring the Rock Mass Stress" Measurement, 22:1–2 (Sep. 10, 1997) pp. 57–68.

* cited by examiner

Primary Examiner—Ian J. Lobo
(74) Attorney, Agent, or Firm—Pillsbury Winthrop LLP

(57) ABSTRACT

The invention provides an instrument suitable for measuring seismic waves in an environment which comprises a wave guide through which a seismic wave may propagate substantially without dispersion wherein the wave guide is provided with means for measuring its deformation.

18 Claims, 2 Drawing Sheets

SEISMIC WAVE MEASURING DEVICES

CROSS REFERENCE TO RELATED APPLICATIONS

Figure 1:
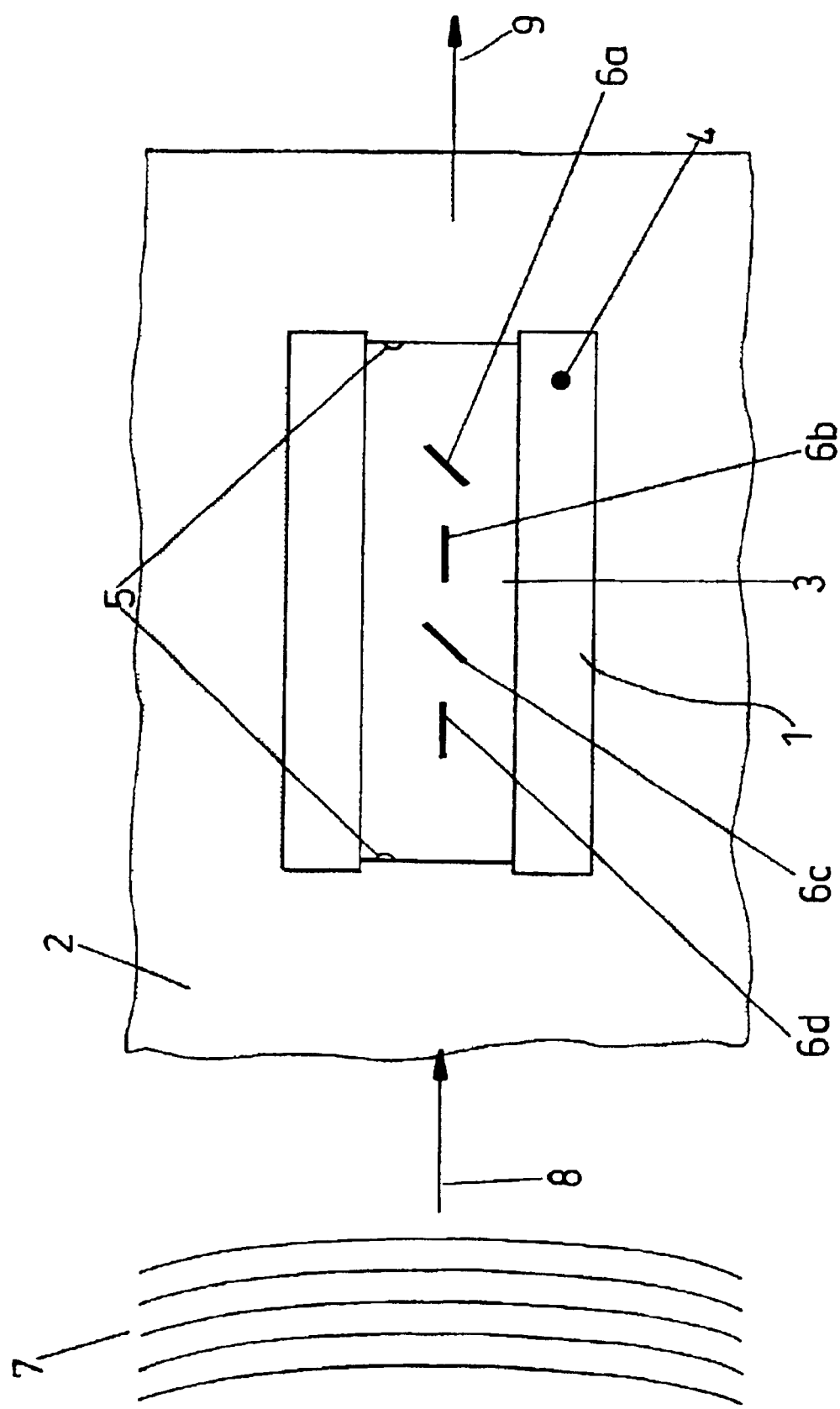

This application is a national phase application based on PCT/IB01/00281, filed Feb. 16, 2001, and which further claims priority from European Application No. 00301184.8, filed Feb. 16, 2000. These applications in their entirety are incorporated herein by reference.

The invention provides an improved device for the measurement of seismic waves.

A large number of victims and enormous economic losses due to the destruction of buildings and industrial plants are caused by natural catastrophic events like earthquakes, landslides provoked by geological instabilities and rock impact caused by mining and large excavation works.

At present seismology does not reliably predict earthquakes. The instrumentation like seismometers and accelerometers, presently used for monitoring such events have been mainly developed in view of measuring only one engineering parameter which is the acceleration. This is used by engineers to calculate the load acting on the earthquake resistant structures using the estimated mass of the structure. Furthermore the present seismometers fail to record with good accuracy the peak values of acceleration, displacement, speed, rise time caused by strong motions in the critical near field of strong earthquakes (P. C. Jenkins, "Engineering Seismology" from "Earthquakes: Observation, Theory and Interpretation", Editors: H. Kanamori and E. Boschi, North Holland, 1983).

The lack of precise measurements of seismic waves parameters (including peak values of acceleration, displacement and speed) impedes the consistent design of buildings and industrial plants resistant to strong earthquakes in the near epicentre area; this fact has been demonstrated by the collapse of important constructions in the recent strong earthquakes. For a more consistent design of buildings, it would be of an advantage to be able to measure directly the seismic waves acting on the buildings. This is because the acting load can be calculated with more accuracy knowing the extent of the foundations.

It is well known that a reliable scientific prediction capability of earthquakes does not exist. This is tragically well demonstrated by the lack of preparation by authorities and populations during the last big earthquakes (Friuli, Mexico City 1985, Aegion 1995, Northridge 1994, Kobe 1995, Umbria 1997, Turkey 1999) which is one of the reasons for the large number of victims.

Some empirical attempts to predict earthquakes were done in Greece based on the change of electric current in the soil some days before the earthquake, and in Japan based on the change of chloride and sulphur content in mineral water but these were largely unsuccessful.

Earthquakes are generally caused by the energy release from the fracture/slip of large geological material masses; the seismic energy release takes place through seismic wave propagation. It is known that large fractures are preceded by small fractures which give rise to lower levels of energy release and to low amplitude seismic waves. They are the precursors of large earthquakes and to predict earthquakes, they must be resolved from the usual continuous microtremors of the earth.

The present seismometers have a too low signal to noise ratio due to environmental conditions (for example wind, change of ambient temperature, pressure and humidity) and earth tremors of other origin to give reliable records of precursors. Therefore the correlation of the seismic wave characteristics with the different phases of the fracture process of geological masses based on the records of present seismometers is too inaccurate to be able to predict earthquakes.

Damaging effects of strong earthquakes on civil engineering constructions are limited to several tens of kilometers (P. C. Jennings "Engineering Seismology") from causative faults. Outside of this range, the motion is still perceptible, but is typically associated only with non-structural damage. One consequence of this situation is that details of records from seismographic instruments are not normally of much significance in engineering seismology.

One reason is because seismographs go off scale in the near field; they are on scale only when the motion is too weak, and usually too dispersed to be greatly informative about the strong shaking. A second reason is that the natural frequencies of the transducers of most seismographs are so low that the measurement of the high frequency ground acceleration in the near field of strong earthquakes from the records is a difficult and inaccurate process. Therefore, there is a lack of knowledge of the amplitude, duration, frequency content and extent of strong shaking.

Furthermore, there is a shortage of records in the very near field (e.g. $\Delta<20$ Km), where for a period less than one second the ground speed can reach values of 10 m/s, imposing very large displacement on the building structures.

The high frequency content of seismographic records is important for progress in earthquake engineering and in strong earthquake prediction because strong motions depend crucially on the detail of the fault rupture mechanics. The measurement of the short rise time from high frequency accelerograms is very inaccurate because of the noise and high variability.

Also to monitor seismic waves in the ground caused by landslides, volcanism, mining rock impact and instability of large civil engineering constructions (e.g. dams), a device is needed which is able to record the wave parameters like rise time, pressure, displacement, ground speed both in the case of low amplitude waves and in the case of peak amplitude waves. It is expected that in these cases the effectiveness of disaster prediction will increase faster than for earthquakes because the correlation of the measured wave parameters with the state of the wave source can be established and verified in a much more reliable way.

It is an object of the invention to provide a new monitoring instrument allowing the accurate measurement of all the seismic wave parameters which can be better correlated with the source of the catastrophic event (fault fracture process) to enable progress in the prediction of such catastrophic events.

According to the invention there is provided an instrument suitable for measuring seismic waves in an environment which comprises a wave guide through which a seismic wave may propagate substantially without dispersion wherein the wave guide is provided with means for measuring its deformation.

As a result of the seismic wave propagating through the wave guide without dispersion, there is no modification in the shape and amplitude of the wave which allow its properties to be measured along the length of the wave guide.

According to the invention there is further provided use of an instrument according to the invention to measure a seismic wave.

The wave guide is preferably a bar mounted in a cavity in the environment. The mechanical impedance of the wave guide is preferably substantially the same as the environment in which the instrument according to the invention is placed.

The substantial matching of the mechanical impedance of the wave guide and of the environment is preferably achieved by choosing the bar material and the geometry of the cavity and of the bar such that:

$$\rho_1 C_1 A_1 = \rho_2 C_2 A_2$$

where:

$\rho_1$ and $\rho_2$ are the density of the environment and of the bar, respectively;

$A_1$ and $A_2$ are the cross-sectional area of the cavity and of the bar, respectively $C_1$ and $C_2$ are the elastic wave velocity in the environment and in the bar, respectively.

As a result of the substantial matching of the mechanical impedance of the wave guide and of the environment, an improvement in the undisturbed entrance and propagation of the seismic wave in the wave guide is produced.

The bar used in the wave guide is preferably metallic (e.g. aluminium). The diameter and length of the bar and the cavity generally depend upon the physical properties of the environment in which the wave guide is placed. More preferably the dimensions of the bar are of from 100 to 150 mm in diameter and from 500 to 750 mm in length.

Noise sources coming from known directions are preferably suppressed by carefully aligning the axis of the bar so as to minimise their effect.

The bar is optionally hollow, e.g. in the form of the tube, in order to obtain improved impedance matching.

A suitable environment in which the instrument could be placed is, for example, the ground or a cavity of a civil engineering structure like dam foundations, a bridge pillon, building foundations etc.

The means for measuring the deformation is preferably electronic. More preferably, it is of sufficiently low mass that it is substantially free from inertia effects. The advantage of this is that such means for measuring deformation can follow the impulsive action of seismic waves up to frequencies higher than 100 KHz. Furthermore such a means for measuring deformation is able to measure a sharp rise time of seismic waves of the order of 10 microseconds. This is an improvement over the constructional parts for conventional seismometers which, due to their great mass (which is many kilograms), cannot follow with clarity the impulsive peak-values of seismic waves and which suffer from inertia effects which limit to some hertz the frequencies of the phenomena which can be recorded. Most preferably the means for measuring the deformation is a high sensitivity semiconductor strain gauge.

The wave guide is preferably provided with at least two means for measuring deformation wherein one is arranged to measure deformation in a direction substantially parallel to a principal axis of the wave guide and the other is arranged to measure deformation in a direction about 45° to a principal axis of the wave guide. The advantage of such an arrangement is that when the wave guide is properly installed, it is possible to distinguish when the pressure and displacement at the interface between the instrument and the environment in which the instrument is placed are imposed by a longitudinal or by a transverse shear seismic wave.

Preferably the wave guide is provided with at least four means for measuring deformation as follows:

at least two parallel means for measuring deformation to measure the deformation of the wave guide along a principal axis of the wave guide which is provoked by a longitudinal seismic wave propagating in the direction of the principal axis; and at least two oblique means for measuring deformation to measure the wave guide deformation at an angle of about 45° to the principal axis of the wave guide which is provoked by a seismic shear wave propagating in the direction of the principal axis.

Each means for measuring deformation is preferably independently connected to a large frequency band width amplifier. The amplifier outlet is preferably recorded, e.g. by being connected to a transient recorder by means of cables or by a radio-link.

Where there are two or more means for measuring deformation connected to amplifiers and having the same alignment relative to the axis of the wave guide, an amplifier of one will have a high gain value calibrated in order to record low amplitude seismic waves (precursors) whilst an amplifier of another will have a low gain in order to record the high peak value of pressure, displacement and particle velocity of high intensity seismic waves.

Thus in the example given above where there are four means for measuring deformation, the amplifiers of one parallel and of one oblique means for measuring deformation preferably have a high gain value calibrated in order to record low amplitude seismic waves (precursors) and the amplifiers of the other parallel and oblique means for measuring deformation will have a low gain in order to record the high peak values of pressure, displacement and particle velocity of high intensity seismic waves.

Preferably wide frequency band width (100 kHz) amplifiers are used to condition the signals from the means for measuring deformation without any frequency modification in order to eventually allow the filtering of environmental noise of known frequency.

Where the means for measuring deformation is electronic, it is preferably connected to its amplifier and/or to its recording equipment via electronic circuitry which is shielded or otherwise rendered insensitive to environmental effects (e.g. change of temperature) and to earth microtremors (e.g. bending and vibrational effects). This is in order to reduce the effect of noise and to improve the clarity in recording low amplitude seismic waves especially compared to the records of traditional seismometers.

All the parts of the instrument (e.g. the bar, semiconductor strain gauges, amplifiers and transient recorder) are of commercial origin and are generally obtainable in robust and severe environment resistant versions.

Preferably at least one wall of the cavity is modified by one or more cuts which enable the instrument to be completely unidirectional and to, more preferably, optimise the mechanical impedance matching between the environment and the wave guide. More preferably four cuts are introduced in the environment in continuation of both sides of the cavity walls parallel to the wave guide axis.

With a suitable arrangement of instruments according to the invention it is possible to measure seismic waves in two and/or three dimensions. Thus to measure seismic waves in two dimensions, two instruments according to the invention are preferably used, placed such that the principal axes of the wave guides are at an angle of about 90° to each other. To measure seismic waves in three dimensions, three instruments according to the invention are preferably used, arranged such that the principal axes of their wave guides are at an angle of about 90° to each other.

The parameters which the instrument according to the invention accurately measures in direct physical contact with the environment where it is placed, are the pressure, displacement, particle speed, rise time imposed by the seismic wave to the environment for longitudinal and transverse seismic waves.

The increased number of accurately measurable wave parameters and the association to the type (i.e. longitudinal or transverse) of seismic wave allow:

In general a more in-depth correlation with the state of the fault fracture which is the source of the earthquake;

In the case of low amplitude seismic waves (earthquake precursors), better correlation with the state of the fault fracture which increases the prediction capability of the catastrophic event on the basis of a logical correlation of cause-effects;

Engineers to design, in a more consistent way than presently, earthquake resistant buildings using the peak values of acceleration, pressure, displacement, speed measured in the near epicentre area.

It is the pressure or tension exerted by the seismic wave on the instrument at its interface with environment which introduces the wave into the instrument; this wave deforms the instrument elastically and this deformation $\epsilon$ is preferably measured by the means for measuring deformation as a function of time t.

By application of the well-known uniaxial elastic wave propagation theory in the means for measuring deformation, it is then possible to calculate all the seismic wave parameters at the interface between the environment and the instrument using the measured deformation $\epsilon(t)$ (which is the variation of the deformation $\epsilon$ over time t) of the wave guide.

The pressure P (or tension T) versus time t exerted in the ground by the seismic wave which is equal to that exerted on the wave guide P(t) is given by:

$$P(t)=E\epsilon(t)$$

where E is the Young modulus of the material used to form the wave guide in the instrument;

The displacement D versus time of the environment imposed by the seismic wave which is equal to the displacement of the interface between the environment and the instrument, is given by:

$$D(t) = C_o \int_o^t \varepsilon(t) \, dt$$

where $C_O$ is the elastic wave speed in the wave guide

The ground particle velocity:

$$V=C_O\epsilon(t)$$

The rise time of the seismic wave is directly inferred from the record and the ground speed and acceleration are calculated from the displacement records.

A further advantage of the instrument of the invention is that it is able to measure both the low and the high amplitude seismic wave parameters corresponding respectively to earthquake precursors and to the strong motions in the near field of large magnitude earthquake.

Another advantage of the instrument of the invention is that it is capable of measuring very large peak values because the elastic limit of the material used to form the wave guide is generally very high in comparison with the elastic limit of the local materials of the environment, therefore avoiding the saturation phenomena of traditional seismometers.

A further important feature of the instrument of the invention compared to traditional strong motion seismometers and accelerometers is the possibility of a direct measurement in physical contact with the environment of the peak value of pressure, displacement, particle speed, rise time, velocity and acceleration of a strong seismic wave created by a high magnitude earthquake in the near epicentre area. The peak values of strong seismic waves cannot be reliably recorded by traditional seismometers because the peak values of impulsive nature are characterised by high frequency (>100 Hz) while the seismometers are typical inertial instruments for the frequencies less than 25 Hz.

The capability of the instrument of the invention to record with high clarity the impulsive high amplitude seismic wave parameters is due to the fact that the seismic wave can enter and propagate in the wave guide without being modified in shape and amplitude due to the continuity of acoustic impedance at the interface between the environment and the instrument and because the wave guide generally remains substantially elastic; this is not the case of seismometers where the coupling between the sensor and the environment in which the sensor is placed is realised through constructive elements which do not comply with this physical principle.

Up to now the peak values of pressure, acceleration, speed, and displacement due to strong earthquakes have not been measured with accuracy and that the existing values are affected by large errors. This is especially true for the measurement of the pressure. The direct measurement of the pressure wave acting on building foundations will give a much more accurate estimation of the load acting on structures during an earthquake.

The seismic engineer community suffers from a lack of accurate data for consistent design of building resistant to the peak values of force, acceleration, displacement and speed resulting from strong earthquakes near the epicentre area, this lack of accurate peak values will be eliminated by the invention.

Another important feature of the invention compared to the traditional seismometer is its capability of having a very high sensitivity and clarity in measuring the parameters of low amplitude seismic waves due to the extremely high sensitivity of the means for measuring deformation provided on the wave guide.

The capability of the invention of recording with clarity wave parameters of low amplitude seismic wave with reduced noise will give seismologists new possibilities of correlating the low amplitude seismic wave (precursors) with the state of the fault rupture and therefore open new perspectives in earthquake prediction.

The new possibilities in earthquake prediction will be assisted by rock fracture laboratory experiments where the records collected in the field can be compared with laboratory records in order to validate the earthquake prediction models.

The invention is illustrated by reference to the following drawings which are not intended to limit the scope of the protection obtained:

BRIEF DESCRIPTION OF THE SEVERAL VIEWS OF THE DRAWING(S)

Figure 2:
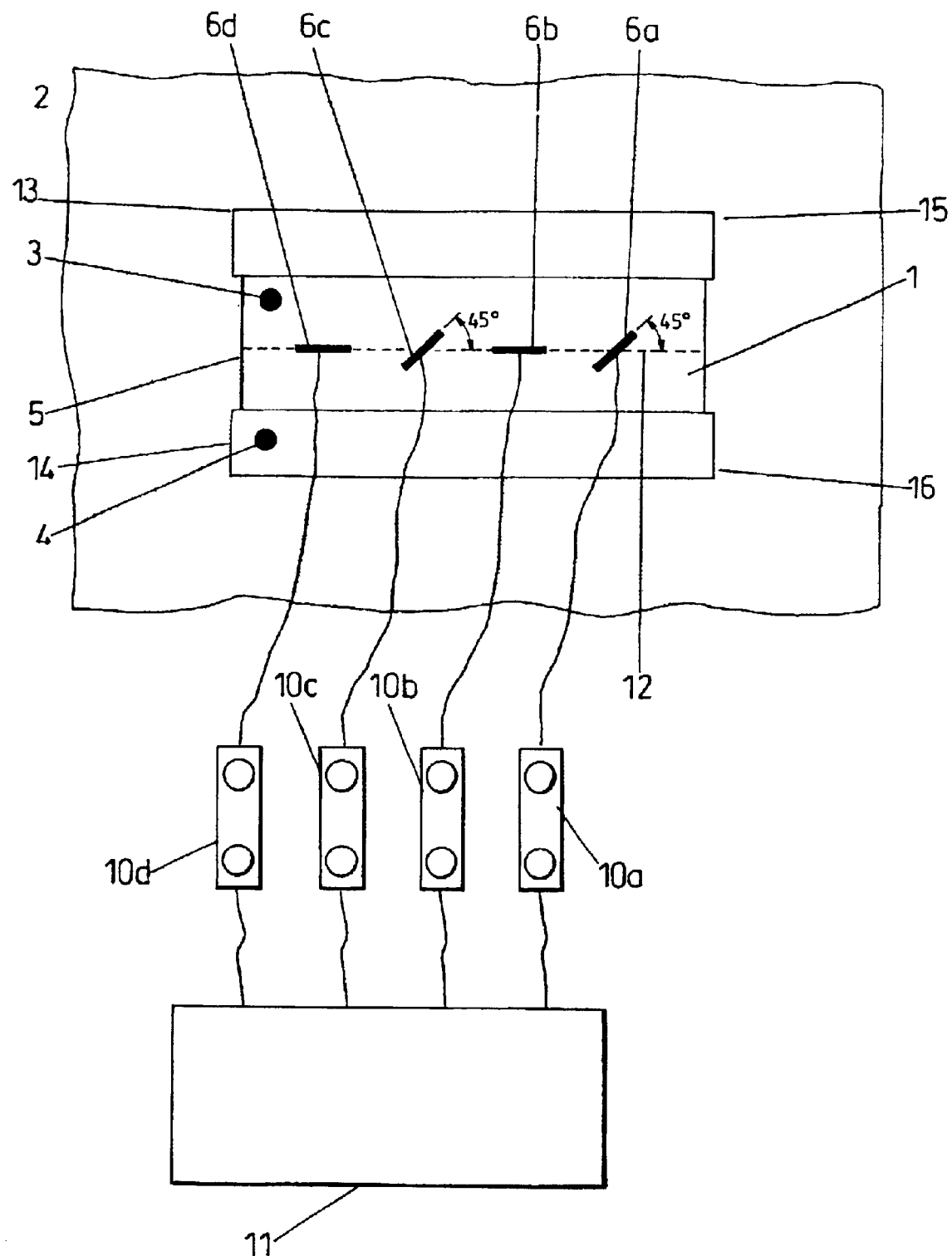

FIG. 1 is a schematic plan view of an instrument according to the invention installed in the ground; and FIG. 2 is a schematic plan view of the instrument according to the invention installed in the ground and connected to recording equipment.

FIG. 1 shows an instrument according to the invention 1 installed in the ground 2. The instrument comprises an aluminium bar 3 which is mounted in cavity 4 and connects with the ground at points 5. Means for measuring deformation which are semi-conductor strain gauges 6a, 6b, 6c and 6d are mounted on the bar 3. The bar 3 and the cavity 4 are arranged so that seismic waves are transmitted through the bar without reflection. This is demonstrated by the representation of the seismic wave 7 preceding through the bar in the directions shown by arrows 8 and 9.

FIG. 2 is a more detailed representation of the instrument shown in FIG. 1. The reference numerals used have the same meaning as in FIG. 1. The principle axis of the bar is shown by dashed line 12. From this it can be seen that semi-conductor strain gauges 6c and 6a are mounted on the bar 3 at a 45° angle to the principle axis 12 whereas semi-conductor strain gauges 6d and 6b are mounted on the bar 3 such that they are parallel to the principal axis 12. Each of the semi-conductor strain gauges 6a, 6b, 6c and 6d is connected to an independent amplifier, 10a, 10b, 10c and 10d respectively. Amplifiers 10a and 10b are large frequency band width conditioning amplifiers with low gain for measure of high amplitude seismic waves particularly in the near field of a strong earthquake. In contrast 10c and 10d are large frequency band width conditioning amplifiers with high gain for measurement of low amplitude seismic waves (for example precursor seismic waves which arise before an earthquake). Each of the amplifiers 10a, 10b, 10c and 10d is connected to an input on transient recorder 11. The walls of the cavity which are parallel to the principal axis of the bar 3 are extended by cuts in the directions 13, 14, 15 and 16 such that the instrument is only capable of measuring seismic waves propagating in the direction of the principal axis of the bar 3.

What is claimed is:

1. A seismic wave measuring device for measuring seismic waves in an environment comprising a wave guide through which a seismic wave may propagate substantially without dispersion said wave guide being provided in a cavity in said environment wherein:

the wave guide is a bar, which is provided with means for measuring deformation of said bar resulting from said wave;

the bar being arranged in the cavity so that it connects with the environment at both ends thereof;

and wherein the bar is formed from a material which, together with the geometry of the cavity and the geometry of the bar are chosen so that the mechanical impedance of the wave guide is substantially the same as the mechanical impedance of the environment in which the device is placed.

2. A device according to claim 1 wherein the cavity and the bar are chosen such that:

$$\rho_1 C_1 A_1 = \rho_2 C_2 A_2$$

where:

$\rho_1$ and $\rho_2$ are the density of the environment and of the bar, respectively;

$A_1$ and $A_2$ are the cross-sectional area of the cavity and of the bar, respectively $C_1$ and $C_2$ are the elastic wave velocity in the environment and in the bar, respectively.

3. A device according to claim 2 wherein the bar is metallic.

4. A device according to 4 or 3 wherein the bar is hollow.

5. A device according to claim 2 wherein the means for measuring deformation is of sufficiently low mass that it is substantially free from inertia effects.

6. A device according to any one of claims 2, 9, 10 or 11 wherein at least one wall of the cavity is modified by one or more cuts which enable the device to be completely unidirectional.

7. A device according to claim 6 wherein four cuts are introduced in the environment in continuation of both sides of walls of the cavity parallel to the principal axis of the wave guide.

8. A device according to claim 1 wherein the wave guide is provided with at least two means for measuring deformation wherein one is arranged to measure deformation in a direction substantially parallel to a principal axis of the wave guide and the other is arranged to measure deformation in a direction about 45° to the principal axis of the wave guide.

9. A device according to claim 1 wherein the wave guide is provided with at least four means for measuring deformation as follows:

at least two parallel means for measuring deformation which measure the deformation of the wave guide along a principal axis of the wave guide which is provoked by a longitudinal seismic wave propagating in the direction of the principal axis; and at least two oblique means for measuring deformation which measure the wave guide deformation at an angle of about 45° to the principal axis of the wave guide which is provoked by a seismic shear wave propagating in the direction of the principal axis.

10. A device according to claim 1 wherein the means for measuring the deformation is electronic.

11. A device according to claim 10 wherein the means for measuring deformation is independently connected to a large frequency band width amplifier.

12. A device according to claim 11 which includes recording equipment to record an output of the means for measuring deformation and/or an output of the amplifier.

13. A device according to claim 10 or 11 which is provided with two or more means for measuring deformation which are connected to amplifiers and which have the same alignment relative to a principal axis of the wave guide wherein an amplifier of at least one has a high gain value calibrated in order to record low amplitude seismic waves whilst an amplifier of at least one other has a low gain calibrated in order to record the high peak values of pressure, displacement and particle velocity of high intensity seismic waves.

14. A device according to claim 13 which includes recording equipment to record an output of at least one of the amplifiers.

15. A device according to claim 10 or claim 11, wherein the means for measuring deformation is connected to an amplifier and/or recording equipment by circuitry which is insensitive to environmental effects.

16. A device according to claim 10, which includes recording equipment to record an output of the means for measuring deformation.

17. A device according to claim 1, wherein the bar is substantially surrounded by empty space.

18. A method for measuring properties of a seismic wave which comprises providing at least one seismic wave device according to claim 1 in an environment in which seismic waves may occur and measuring the deformation of said guide by a seismic wave when a seismic wave is received by said guide.

* * * * *